(12) United States Patent
Menjak et al.

(10) Patent No.: US 7,380,828 B2
(45) Date of Patent: Jun. 3, 2008

(54) STATIONARY WHEEL HUB

(75) Inventors: Ratko Menjak, Frankenmuth, MI (US); Timothy W. Kaufmann, Frankenmuth, MI (US); Stephen V. Gillman, Grand Blanc, MI (US); Brian J. Magnus, Frankenmuth, MI (US); Michael J. Cole, Saginaw, MI (US); Damir Menjak, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 370 days.

(21) Appl. No.: 11/076,222

(22) Filed: Mar. 9, 2005

(65) Prior Publication Data

US 2006/0202462 A1    Sep. 14, 2006

(51) Int. Cl.
*B62D 1/16*    (2006.01)
(52) U.S. Cl. .................. 280/779; 74/494; 200/61.54
(58) Field of Classification Search .............. 280/771, 280/775, 779; 74/492, 493, 498, 484 R; 200/61.54
See application file for complete search history.

(56) References Cited

U.S. PATENT DOCUMENTS

| 1,795,566 | A | 3/1931 | MacComb |
| 1,944,905 | A | 1/1934 | Rowell |
| 2,465,825 | A | 3/1949 | Tucker |
| 2,622,690 | A | 12/1952 | Barenyi |
| 3,734,051 | A | 5/1973 | Dahl |
| 3,910,597 | A | 10/1975 | Seko |
| 4,013,034 | A | 3/1977 | Cantley et al. |
| 4,368,454 | A | 1/1983 | Pilatzki |
| 4,429,588 | A | * 2/1984 | Emundts et al. .......... 74/484 R |
| 4,485,371 | A | 11/1984 | Yamada et al. |
| 4,603,599 | A | 8/1986 | Matsuoka |
| 4,625,578 | A | 12/1986 | Nishijima |
| 4,674,352 | A | * 6/1987 | Mizuno et al. .......... 74/484 R |
| 4,771,650 | A | 9/1988 | Kerner |
| 5,072,628 | A | * 12/1991 | Oki .......................... 74/484 R |
| 5,465,632 | A | * 11/1995 | Oki et al. ..................... 74/493 |
| 6,109,651 | A | 8/2000 | Frisch |
| 6,142,504 | A | 11/2000 | Papandreou |
| 6,145,402 | A | * 11/2000 | Nishitani et al. .......... 74/484 R |
| 2004/0168848 | A1* | 9/2004 | Bohner et al. .............. 180/403 |

* cited by examiner

*Primary Examiner*—Saul Rodriguez
*Assistant Examiner*—Drew J. Brown
(74) *Attorney, Agent, or Firm*—Michael D. Smith

(57) ABSTRACT

The invention provides a steering column assembly for a vehicle and a method for manufacturing the steering column assembly. The steering column assembly includes a steering column member having an aperture extending along an axis. The steering column assembly also includes a steering shaft rotatably disposed at least partially in the aperture. The steering shaft includes a steering wheel engaging end axially spaced from the aperture. The steering column assembly also includes a supporting member for supporting a vehicle accessory. The supporting member is cantilevered from the steering column member and cooperates with the steering column member to define a groove substantially surrounding the steering wheel engaging end.

14 Claims, 4 Drawing Sheets

STATIONARY WHEEL HUB

FIELD OF THE INVENTION

The invention relates to a steering column of a vehicle and more particularly to a steering column supporting a hub portion that for supporting vehicle accessories wherein the hub is generally surrounded by a steering wheel.

BACKGROUND OF THE INVENTION

A steering column usually extends into the vehicle passenger compartment under the instrument panel. One or more gages are mounted, or clustered, on the instrument panel. In the past, gages which are not included on the instrument panel have been fixedly mounted to the steering column structure. Examples of these arrangements are shown in U.S. Pat. Nos. 1,795,566; 1,944,905; 2,465,825; and 4,368,454.

SUMMARY OF THE INVENTION AND ADVANTAGES

The invention provides a steering column assembly for a vehicle and a method for manufacturing the steering column assembly. The steering column assembly includes a steering column member having an aperture extending along an axis. The steering column assembly also includes a steering shaft rotatably disposed at least partially in the aperture. The steering shaft includes a steering wheel engaging end axially spaced from the aperture. The steering column assembly also includes a supporting member for supporting a vehicle accessory. The supporting member is cantilevered from the steering column member and cooperates with the steering column member to define a groove substantially surrounding the steering wheel engaging end.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
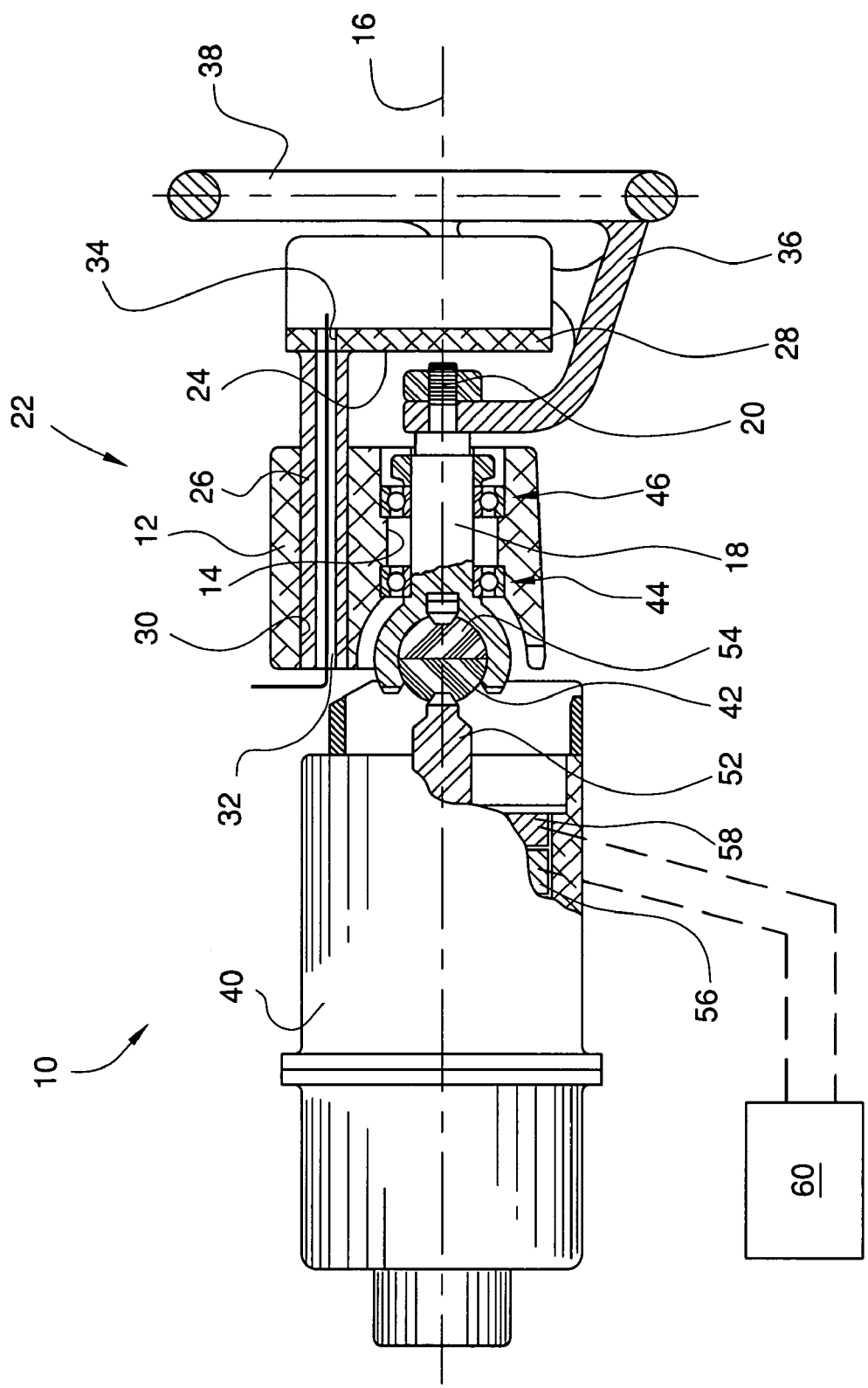
FIG. 1 is a left-hand, partial cross-sectional view of a first exemplary embodiment of the invention wherein the partial cross-section is taken a longitudinal axis of a steering column.

A plurality of different embodiments of the invention are shown in the Figures of the application. Similar features are shown in the various embodiments of the invention. Similar features have been numbered with a common reference numeral and have been differentiated by an alphabetic designation. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Figure 2:
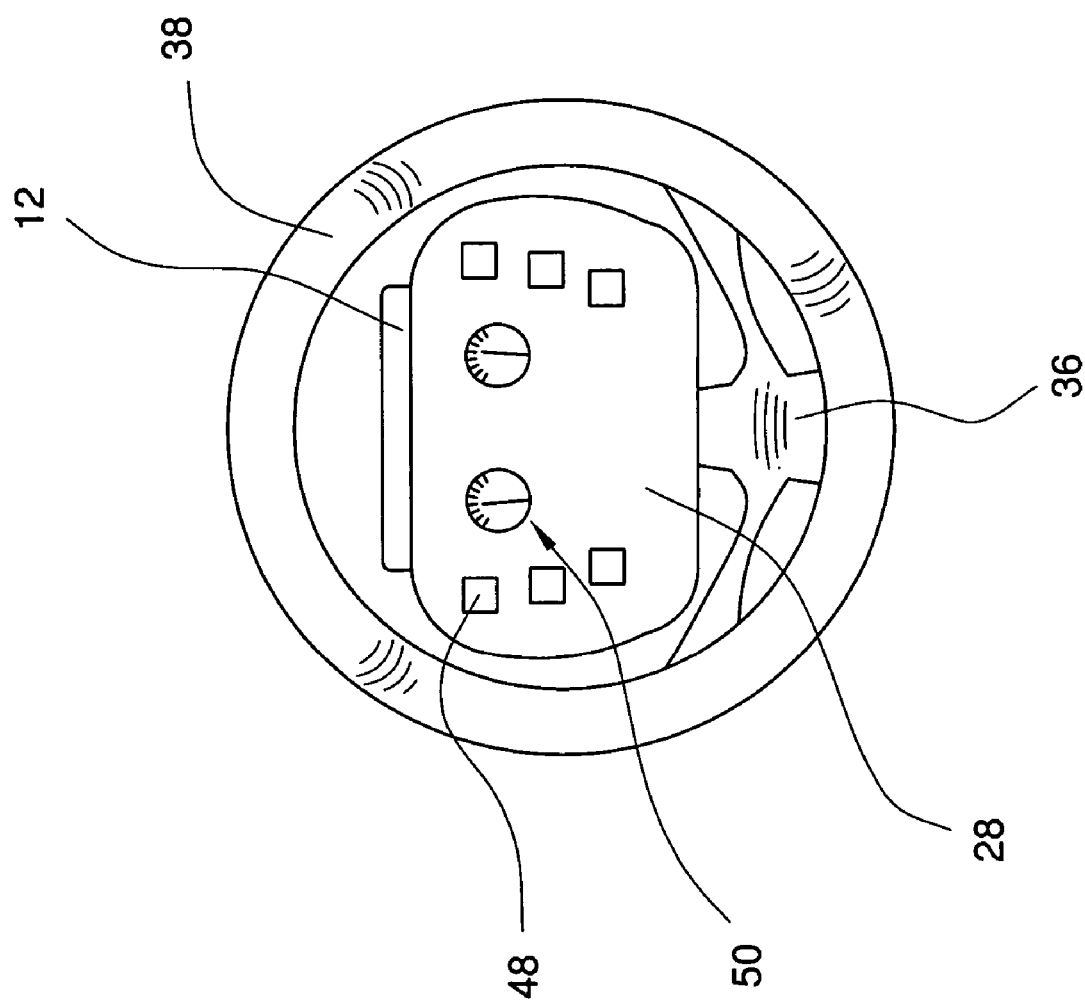
FIG. 2 is a front view of the first exemplary embodiment of the invention.

Referring now to FIGS. 1 and 2, in a first exemplary embodiment of the invention, a steering column assembly 10 includes a steering column member 12 having an aperture 14 extending along an axis 16. The steering column member 12 is a tilt housing. The steering column assembly 10 also includes a steering shaft 18 rotatably disposed at least partially in the aperture 14. First and second bearings 44, 46 are disposed in the aperture 16 and support the steering shaft 18 in rotation relative to the steering column member 12. The steering shaft 18 includes a steering wheel engaging end 20 axially spaced from the aperture 14. The steering column assembly 10 also includes a supporting member 22 for supporting a vehicle accessory. The vehicle accessory can be an actuator, such as push-button 48 or a gage 50. The push-button 48 can control an operation associated with the vehicle such as activating or deactivating lights, adjusting music parameters from a sound system of the vehicle, adjusting cruise control of the vehicle, or any other controllable operation associated with the vehicle. The gage 50 can provide a visual indication of any condition sensed by a sensor associated with the vehicle such as oil pressure, engine speed (rpm), vehicle speed, amount of fuel, or any other condition sensed by a sensor associated with the vehicle. The supporting member 22 of the first exemplary embodiment supports a plurality of a vehicle accessories. The supporting member 22 is cantilevered from the steering column member 12 and cooperates with the steering column member 12 to define a groove 24 substantially surrounding the steering wheel engaging end 20.

The supporting member 22 includes a beam portion 26 and a plate portion 28. The beam portion 26 extends parallel to the steering shaft 18 and away from the steering column member 12, beyond the steering wheel engaging end 20. The plate portion 28 extends substantially perpendicular to the beam portion 26 towards the axis 16 such that the steering wheel engaging end 20 is rotatably disposed between the plate portion 28 and the steering column member 12 along the axis 16. The groove 24 extends transverse to the axis 16.

The steering column member 12 includes a second aperture 30 and the beam portion 26 extends in the second aperture 30. The beam portion 26 defines an interior 32 and the plate portion 28 includes an aperture 34 communicating with the interior 32. Electrical or mechanical connections, such as wires or cables, extending from the vehicle accessory supported on the plate portion 28 can extend through the aperture 34, the interior 32, and the aperture 30 to remote locations.

The steering column assembly 10 also includes a bracket 36 and a steering wheel 38. The bracket 36 is engaged with the steering wheel engaging end 20 and extends out of the groove 24 and around the supporting member 22. The steering wheel 38 is engaged with the bracket 36 and encircles at least a portion of the supporting member 22. As shown in FIG. 2, the steering wheel 38 encircles the supporting member 28. As shown in FIG. 1, the steering wheel 38 is axial spaced from the supporting member 28.

The bracket 36 and the supporting member 22 cooperate to limit rotation of the steering shaft 18. For example, the steering shaft 18 is rotatable less than 360 degrees. The bracket 36 will contact the supporting member 22 during rotation an be prevented from further rotation. The size of the beam portion 26 can be minimized to maximize the extent of rotation of steering shaft 18.

Figure 3:
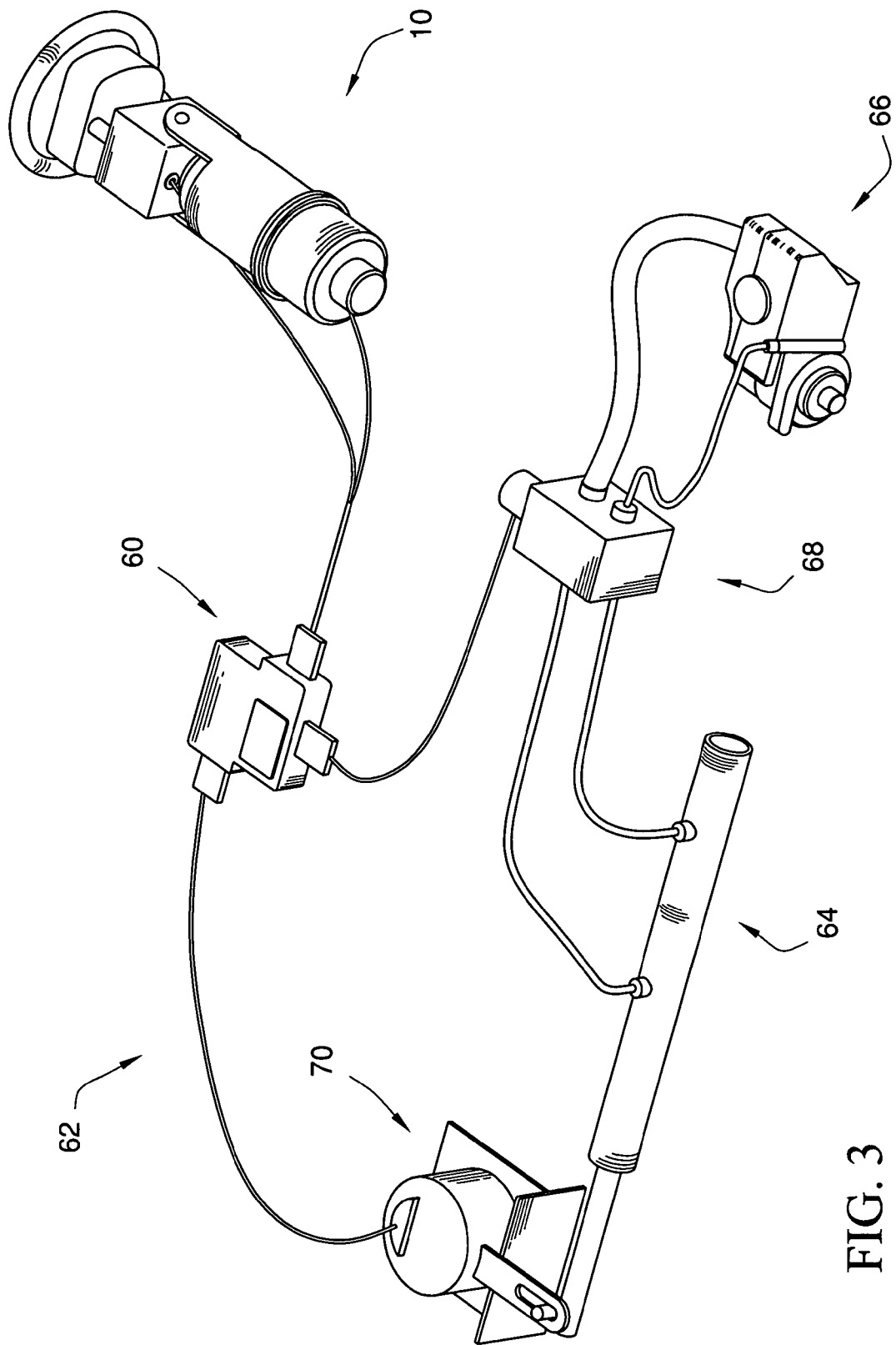
FIG. 3 is a perspective view of a steering-by-wire system incorporating the first exemplary embodiment of the invention.

The steering column assembly 10 also includes a steering column jacket 40 pivotally engaged with the steering column member 12 about a tilt axis 42. The groove 24 and the tilt axis 42 extend parallel to one another. A second steering shaft 52 is connected to the steering shaft 18 for concurrent rotation by a u-joint 54 at the tilt axis 42. First and second redundant position sensors 56, 58 are disposed to sense rotation of the shaft 52. The sensors 56, 58 communicate signals corresponding to the rotational position of the shaft 52 to a controller 60. Referring now to FIG. 3, the controller 60 controls a steering-by-wire system 62. The system 62 includes a power cylinder 64 operably associated with a steering system of a vehicle to more steering components of the vehicle. For example, the power cylinder 64 can be engaged with one or more wheels of a vehicle to move the wheels as desired to steer the vehicle, or be engaged with the rudder of a watercraft to move the rudder as desired to pilot the watercraft. The power cylinder 64 of the exemplary steering-by-wire system 62 is a hydraulic cylinder having piston (not visible) internally disposed of a tube. The system 62 also includes a pump 66 to urge fluid to the power cylinder 64 and a valve 68 to selectively direct fluid to one side of the piston. The system 62 also includes a position sensor 70 associated with an output end of the power cylinder 64. The sensors 56, 58 and 70 communicate with the controller 60 and, in response, the controller 60 controls the pump 66 and the valve 68. In operation, the driver of the vehicle turns the steering wheel 38, which turns the shafts 18 and 52. The position sensors 56 and 58 sense rotation of the shaft 52 and communicates sensed conditions to the controller 60. The controller 60 receives signals from the position sensors 56 and 58 corresponding to sensed conditions and controls the pump 66 to pump fluid and also controls the valve 68 to direct fluid to the side of the piston corresponding to the desired direction of vehicle turning.

Figure 4:
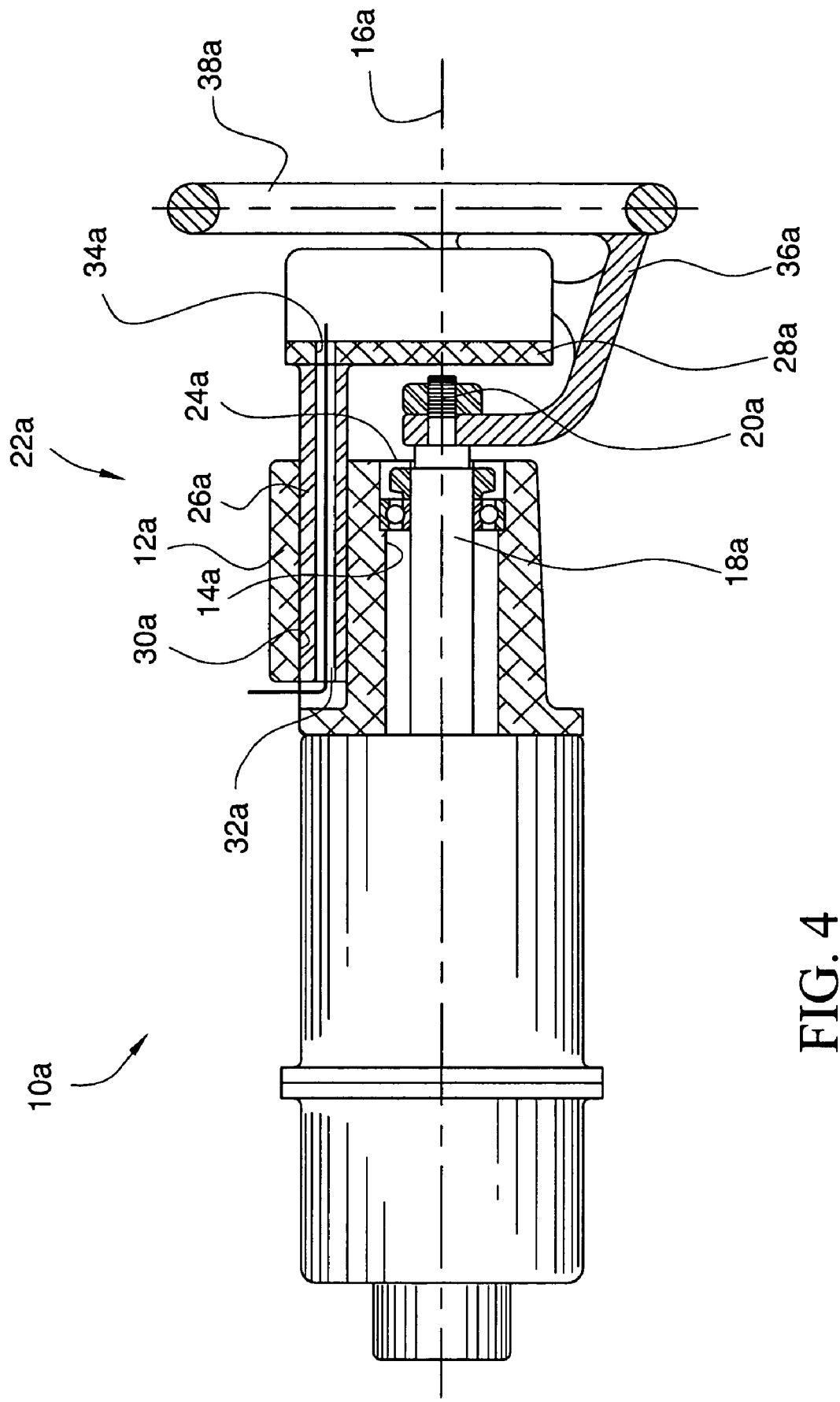
FIG. 4 is a left-hand, partial cross-sectional view of a second exemplary embodiment of the invention wherein the partial cross-section is taken a longitudinal axis of a steering column.

Referring now to FIG. 4, in a second exemplary embodiment of the invention, a non-tiltable steering column assembly 10a includes a steering column member 12a having an aperture 14a extending along an axis 16a. The steering column assembly 10a also includes a steering shaft 18a rotatably disposed at least partially in the aperture 14a. The steering shaft 18a includes a steering wheel engaging end 20a axially spaced from the aperture 14a. The steering column assembly 10a also includes a supporting member 22a for supporting a vehicle accessory. The supporting member 22a is cantilevered from the steering column member 12a and cooperates with the steering column member 12a to define a groove 24a substantially surrounding the steering wheel engaging end 20a. The supporting member 22a includes a beam portion 26a disposed in an aperture 30a and a plate portion 28a. The beam portion 26a defines an interior 32a and the plate portion 28a includes an aperture 34a communicating with the interior 32a. The steering column assembly 10a also includes a bracket 36a and a steering wheel 38a.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering column assembly for a vehicle comprising:
   a steering column member having an aperture extending along an axis;
   a steering shaft rotatably disposed at least partially in said aperture and having a steering wheel engaging end axially spaced from said aperture; and
   a supporting member for supporting a vehicle accessory and including a beam portion extending along and spaced from said axis and mounted to and cantilevered from said steering column member and further including a plate portion mounted to said beam portion and extending substantially perpendicular to said beam portion towards said axis and axially spaced from said steering wheel engaging end along said axis wherein said steering column member, said beam portion and said plate portion cooperate together to define a groove substantially surrounding said steering wheel engaging end.

2. The steering column assembly of claim 1 wherein said supporting member extends parallel to and spaced from said steering shaft.

3. The steering column assembly of claim 1 wherein said steering column member and said supporting member are rotationally fixed with respect to one another.

4. The steering column assembly of claim 1 wherein said groove extends transverse to said axis.

5. The steering column assembly of claim 1 wherein said beam portion extends away from said steering column member beyond said steering wheel engaging end and said steering wheel engaging end is rotatably disposed between said plate portion and said steering column member along said axis.

6. The steering column assembly of claim 5 wherein said steering column member includes a second aperture and said beam portion extends in said second aperture.

7. The steering column assembly of claim 5 wherein said beam portion defines an interior.

8. The steering column assembly of claim 7 wherein said plate portion further comprises an aperture communicating with said interior.

9. The steering column assembly of claim 1 further comprising:
   a bracket engaged with said steering wheel engaging end and extending out of said groove and around said supporting member; and
   a steering wheel engaged with said bracket and encircling at least a portion of said supporting member.

10. The steering column assembly of claim 9 wherein said bracket and said supporting member cooperate to limit rotation of said steering shaft.

11. The steering column assembly of claim 10 wherein said steering shaft is rotatable less than 360 degrees.

12. The steering column assembly of claim 9 further comprising:
   at least one sensor operably disposed to sense rotation of said steering wheel and emit a signal corresponding to said sensed rotation;
   a power cylinder spaced from said steering wheel and having a piston moveable in first and second opposite directions; a pump disposed to pump fluid to said power cylinder;

a valve operably positioned between said pump and said power cylinder to direct fluid to one side of said piston; and a controller disposed to receive said signal from said at least one sensor and control said valve and said pump in response to said signal.

13. A steering column assembly for a vehicle comprising:

a steering column member having an aperture extending along an axis;

a steering shaft rotatably disposed at least partially in said aperture and having a steering wheel engaging end axially spaced from said aperture;

a supporting member for supporting a vehicle accessory and cantilevered from said steering column member and cooperating with said steering column member to define a groove substantially surrounding said steering wheel engaging end; and a steering column jacket pivotally engaged with said steering column member about a tilt axis, wherein said groove and said tilt axis extend parallel to one another.

14. A steering column assembly for a vehicle comprising:

a steering column member having an aperture extending along an axis;

a steering shaft rotatably disposed at least partially in said aperture and having a steering wheel engaging end axially spaced from said aperture;

a supporting member for supporting a vehicle accessory and cantilevered from said steering column member and cooperating with said steering column member to define a groove substantially surrounding said steering wheel engaging end, wherein said steering column member and said supporting member are rotationally fixed with respect to one another;

a bracket engaged with said steering wheel engaging end and extending out of said groove and around said supporting member; and a steering wheel engaged with said bracket and encircling and axially offset from at least a portion of said supporting member.

* * * * *